United States Patent [19]

Lewis et al.

[11] 4,324,698

[45] Apr. 13, 1982

[54] FLUORIDED CRACKING CATALYST

[75] Inventors: Paul H. Lewis; Joseph A. Durkin, both of Groves; Joseph A. Froelich, Nederland, all of Tex.

[73] Assignee: Texaco Inc., White Plains, N.Y.

[21] Appl. No.: 198,859

[22] Filed: Oct. 20, 1980

[51] Int. Cl.³ .................... B01J 29/12; B01J 37/26
[52] U.S. Cl. .................... 252/455 Z; 252/441; 208/115
[58] Field of Search .................... 252/441, 455 Z; 208/115, 135

[56] References Cited

U.S. PATENT DOCUMENTS 3,097,155 7/1963 Friedman et al. ............... 208/115 X
3,113,844 12/1963 Hemminger .................... 208/115 X
3,318,821 5/1967 Pollitzer et al. ................ 252/441 X
4,191,638 3/1980 Plank et al. ..................... 252/455 Z

*Primary Examiner*—Carl F. Dees
*Attorney, Agent, or Firm*—Cooper, Dunham, Clark, Griffin & Moran

[57] ABSTRACT

An improved zeolite-containing cracking catalyst prepared by treating a zeolite-containing cracking catalyst with an aqueous solution containing a fluorine compound, drying and calcining the fluorided catalyst. In a preferred embodiment, the fluorinating solution is an aqueous solution of hydrogen fluoride. The fluorided catalyst may be used per se as a cracking catalyst, or may be physically mixed with a metallic reforming catalyst for use as a cracking catalyst. The fluorided cracking catalysts exhibit improved activity and yield higher octane products than unfluorided cracking catalysts.

8 Claims, No Drawings

FLUORIDED CRACKING CATALYST

BACKGROUND OF THE INVENTION

This invention relates to an improved cracking catalyst. More particularly, this invention relates to a zeolite-containing cracking catalyst which is improved by treatment with an aqueous solution containing a fluorine compound.

In the art of conversion of hydrocarbons, catalytic activity is usually described as either hydrogenative or acidic. Cracking reactions depend on the acidic activity of catalysts. Crystalline alumino-silicates, known generally as zeolites or molecular sieves, have proved exceptionally valuable as acidic and, hence, as cracking catalysts.

Cracking reactions are used to convert heavier hydrocarbons into products having a lower average molecular weight useful in the production of motor fuels. Cracked products generally have a lower octane number than that desired for gasoline blending components. To minimize further processing, such as catalytic reforming operations, it is desirable that the gasoline components of the products of the cracking operation have as high an octane number as possible.

It is known in the art that catalytic activity of solid contact catalysts may be enhanced by incorporating into the catalyst acid activators, such as fluorine. See generally Choudhary, *Ind. Eng. Chem., Prod. Res. Dev.*, 16, 12 (1977). Prior to the advent of zeolite cracking catalysts, amorphous-type catalysts, for example, alumina and silica-alumina catalysts, were enhanced by treatment with various flourine compounds under anhydrous or aqueous conditions. For example, U.S. Pat. Nos. 2,336,165 (Connolly), 2,483,131 (Garrison), 2,694,674 (Starr et al.), and 2,848,380 (Thomas) all describe the preparation of improved alumina and silica-alumina cracking catalysts by treatment with various fluorine compounds.

More recent patents relate to the methods for fluoriding zeolite-containing catalyts. U.S. Pat. No. 3,137,656 (Mason et al.) describes a method for haliding a hydrocracking catalyst which may comprise crystalline alumino-silicates by treatment with an anhydrous halide. The resulting catalyst has enhanced hydrocracking activity but must be used in a carefully controlled anhydrous atmosphere to prevent stripping off of the loosely held halide. Use in a wet atmosphere or treatment with an aqueous halide agent is disclosed as detrimental to catalyst activity. U.S. Pat. No. 3,702,312 (Wilson) describes a method for incorporating fluorine into the crystal lattice of an alumino-silicate by a sequence of steps involving: removing sodium from the zeolite by ion exchange with a divalent alkaline earth metal, especially calcium; treating with a sequestering agent; contacting the exchanged zeolite with an aqueous solution containing aluminum, fluoride, and chloride ions; and washing with water. This patent demonstrates (Example I) the inapplicability of conventional halide impregnation techniques, such as treatment with aqueous hydrogen fluoride, for treatment of zeolites.

U.S. Pat. Nos. 4,097,368 (Hayes) and 4,098,679 (Hayes) describe dual-function composite catalysts comprising a combination of three or four metals on a porous carrier which may comprise a zeolite. Halogen may be added to the carrier in any suitable manner, for example, by treatment with an aqueous solution of hydrogen fluoride.

The present invention relates to a fluorided cracking catalyst comprising a zeolite in a silica-alumina matrix and to a process employing said catalyst. According to the present invention, a zeolite-containing cracking catalyst is fluorided by treatment with an aqueous solution containing a fluorine compound. According to one embodiment, the fluorided catalyst may be used per se as an improved cracking catalyst. In another embodiment, the fluorided catalyst is physically mixed with a metallic reforming catalyst and the composite is used as an improved cracking catalyst. Use of the catalysts of the invention in cracking reactions results in greater cracking activity and higher octane products than can be obtained with unfluorided cracking catalysts.

SUMMARY AND DETAILED DESCRIPTION OF THE INVENTION

In accordance with the present invention, an improved cracking catalyst is provided comprising a zeolite in a silica-alumina matrix, and about 0.1 to about 5 percent by weight of fluorine, said improved catalyst prepared by treating a zeolite-containing cracking catalyst with an aqueous solution containing a fluorine compound dissolved therein, drying and then calcining the fluorided catalyst. The fluorided zeolite-containing composition may be used as the improved catalyst.

In another embodiment of the invention, the improved cracking catalyst comprises a physical mixture of about 90 to about 95 percent by weight of the fluorided zeolite-containing catalyst described above and about 5 to about 10 percent by weight of a metallic reforming catalyst. The metallic reforming catalyst comprises about 0.01 to about 2 percent by weight of platinum on an alumina support. Optionally, the reforming catalyst may also contain about 0.01 to about 5 percent by weight of a metal selected from the group consisting of germanium, tin, and rhenium. A reforming catalyst containing 0.375% by weight of Pt and 0.25% by weight of Ge on an alumina support commercially sold under the trade name UOP R-22 by UOP, Inc., Des Plaines, Ill., is suitable.

The zeolite which may be used in the practice of this invention may be a naturally occurring or synthetically prepared Y zeolite. Preferably, the zeolite is associated with a silica-alumina support but may contain additional alumina, preferably in the gamma or eta form. The present invention is not confined to fluoriding a fresh catalyst, but also contemplates fluoriding a used catalyst.

Although the precise form in which fluorine is combined with the zeolite-containing cracking catalyst is not entirely known, it is customary in the art to refer to the fluorine as being combined in the form of fluoride. The present invention, however, is not limited to catalysts in which the fluorine is present as fluoride, but embraces all forms of fluorine incorporated into the zeolite-containing catalyst when prepared as described above.

Hydrogen fluoride is the preferred fluoriding agent for this invention although other fluorine compounds, such as ammonium fluoride, ammonium bifluoride, boron trifluoride, ammonium fluborate, and ammonium fluosilicate are also suitable. Fluoriding of the zeolite-containing cracking catalyst may be accomplished by an incipient wetness impregnation technique described hereinafter.

Following the fluoriding step, the zeolite-containing cracking catalyst should contain about 0.1 to about 5 percent by weight of fluoride, most preferably, about 1 percent by weight. The fluorided catalyst is then dried at a temperature of about 200° F. to about 600° F., preferably at about 300° F., for about 2 to about 24 hours. Finally, the fluorided catalyst is calcined for about 0.5 to about 10 hours at a temperature of about 700° F. to about 1100° F., preferably at about 1000° F.

Cracking is achieved by contacting a hydrocarbon charge stock with the cracking catalyst described herein. The contacting may be accomplished by any conventional technique, for example, by using the catalyst in a fixed bed system, a moving bed system, a fluidized bed system or in a batch type operation. The conditions under which the improved cracking catalyst may be used are those customarily used in the art for cracking reactions. Thus, temperatures from about 850° F. to about 1025° F. and pressures of about 10 to about 25 psig are ordinarily used.

The following examples are presented to illustrate more fully the nature and manner of practicing the invention.

EXAMPLES

A commercial cracking catalyst, catalyst A, was treated in accordance with the process of this invention. Catalyst A comprises a Y zeolite in a silica-alumina matrix. Catalyst A had previously been used in a commercial cracking operation and had the following physical characteristics prior to fluoriding: surface area=98 $m^2$/gm, pore volume=0.36 cc/gm; density (loose)=0.76 g/cc; alumina=38.1 wt.%; average particle size=55 microns.

Catalyst A was fluorided by an incipient wetness impregnation technique. Aqueous hydrogen fluoride solution was prepared by diluting 4 grams of concentrated HF acid with 136 ml of distilled water. 70 ml of the HF solution was added to 100 grams of the catalyst at 32° F. with mixing in order to distribute the solution on the catalyst. The nominal loading of the fluoride was 1 percent by weight. After a 16 to 24 hour period of contact, moisture was removed by drying the catalyst at 300° F. Finally, the fluorided catalyst was calcined at 1000° F. for 2 hours.

In Examples 1 and 2, comparisons were made between the cracking activities of a fluorided and unfluorided zeolite-containing cracking catalyst (Catalyst A) at 900° F. and 1000° F. In Examples 3 and 4, comparisons were made between the cracking activities of a fluorided and unfluorided cracking catalyst (Catalyst A) physically mixed with 10 percent by weight of a metallic reforming catalyst (Catalyst B). Catalyst B contained 0.375 percent by weight Pt and 0.25 percent by weight Ge on an alumina support.

Tests were conducted in a pulsed feed, fixed bed microreactor unit designed to evaluate cracking catalysts. The tests were conducted with a hydrocarbon charge stock having the following properties:

TABLE 1

| | |
|---|---|
| Gravity, °API | 36.7 |
| Viscosity at 100° F., SUS | 4.3 |
| Viscosity at 210° F., SUS | 1.5 |
| Pour Point, °F. | 20 |
| Sulfur, wt. % | 0.08 |
| Conradson Carbon Residue, wt. % | None |
| Bromine No. | 3 |
| ASTM Distillation (D-2887) | °F. |
| Initial Boiling Point | 318 |
| 5% | 435 |
| 10% | 465 |
| 20% | 498 |
| 30% | 522 |
| 40% | 543 |
| 50% | 566 |
| 60% | 586 |
| 70% | 610 |
| 80% | 645 |
| 90% | 692 |
| 95% | 735 |
| End Point | 856 |

In each of the test runs, 4 grams of catalyst were contacted with 1.3 grams of the test feed during a 75 second pulse. The catalyst to oil weight ratio was 3 and the Weight Hourly Space Velocity (WHSV) was 16. The results of the tests are summarized in Tables II and III.

TABLE II

| | Example 1 | | | Example 2 | | |
|---|---|---|---|---|---|---|
| Catalyst | A | A(1% HF) | Δ | A | A(1% HF) | Δ |
| No. of Tests | 9 | 4 | | 4 | 3 | |
| Reactor Temp., °F. | 900 | 900 | | 1000 | 1000 | |
| RON, Calculated | 89.2 | 90.5 | +1.3 | 94.3 | 95.1 | +0.8 |
| Conversion, wt. % | 61.4 | 67.7 | +6.3 | 69.2 | 71.9 | +2.7 |
| Naphtha, wt. % | 38.0 | 39.4 | +1.4 | 33.9 | 29.4 | −4.5 |
| LCO, wt. % | 25.3 | 20.2 | −5.1 | 17.5 | 12.4 | −5.1 |
| Aromatics, wt. % | 5.7(15.1%)* | 6.5(16.6%)* | +0.8 | 11.0(32.6%)* | 10.3(35.1%)* | −0.7 |
| Olefins, wt. % | 9.6(25.3%)* | 10.4(26.5%)* | +0.8 | 8.3(24.6%)* | 6.8(23.4%)* | −1.5 |
| Carbon, wt. % | 8.3 | 6.7 | −1.6 | 6.4 | 6.0 | −0.4 |

*Numbers in parenthesis represent the percent aromatics and olefins in the naphtha fraction of the liquid product.

TABLE III

| | Example 3 | | | Example 4 | | |
|---|---|---|---|---|---|---|
| Catalyst | 10% B + 90% A | 10% B + 90% A(1% HF) | Δ | 10% B + 90% A | 10% B + 90% A(1% HF) | Δ |
| No. of Tests | 7 | 4 | | 2 | 3 | |
| Reactor Temp., °F. | 900 | 900 | | 1000 | 1000 | |
| RON, Calculated | 89.9 | 91.2 | +1.3 | 95.0 | 96.5 | +1.5 |
| Conversion, wt. % | 55.3 | 56.4 | +1.1 | 67.5 | 64.3 | −3.2 |
| Naphtha, wt. % | 36.2 | 30.1 | −6.1 | 33.2 | 26.8 | −6.4 |
| LCO, wt. % | 31.6 | 28.9 | −2.7 | 23.7 | 18.9 | −4.8 |
| Aromatics, wt. % | 5.7(16.0%)* | 5.9(19.9%)* | +0.2 | 10.5(31.7%)* | 10.8(40.6%)* | +0.3 |
| Olefins, wt. % | 10.3(28.7%)* | 8.7(29.0%)* | −1.6 | 9.2(27.9%)* | 6.5(24.4%)* | −2.7 |

TABLE III-continued

| | Example 3 | | | Example 4 | |
|---|---|---|---|---|---|
| Carbon, wt. % | 8.8 | 6.3 | −2.5  7.5 | 9.6 | +2.1 |

*Numbers in parenthesis represent the percent aromatics and olefins in the naphtha fraction of the liquid product.

The liquid products from the tests were collected in a receiver cooled in an ice-water bath. The products were analyzed on a Chromatograph. Conversion, naphtha, and light cycle oil (LCO) were determined by ASTM Method D-2887-73. Conversion was calculated as the percentage of the original charge with a boiling point below 421° F. after cracking. The naphtha was the liquid product fraction with a boiling point below 421° F. The light cycle oil boils in the range of 421° F. to 670° F.

Research Octane Numbers (RON) were calculated by analyzing the naphtha fraction into specific groups and assigning an octane factor to each group. The octane numbers of the products are based upon the amount of each specific group in the product and the octane factor assigned to each group. See P. C. Anderson, J. M. Sharkey, and R. P. Walsh, *J. Inst. Pet.*, 58, 83 (1972).

Example 1 shows that at 900° F., fluoriding of the zeolite-containing cracking catalyst produced an increase in RON, naphtha yield, and catalyst activity relative to an untreated catalyst. The fluorided catalyst also produced more aromatics and olefins, and produced less light cycle oil, and carbon than the untreated sample.

Example 2 demonstrates that the fluorided catalyst continued to show improved octane and increased conversion at higher temperatures. Although at 1000° F. the naphtha yield from the fluorided catlyst was less than from the unfluorided catalyst, the percentage of aromatics to naphtha increased upon fluoriding.

Examples 3 and 4 summarize the data obtained with a physical mixture of reforming catalyst and both fluorided and unfluorided zeolite-containing cracking catalyst. Studies at 900° and 1000° F. show an improvement in octane numbers for the fluorided catalyst relative to the unfluorided catalyst. The 900° F. data also show that the composition comprising 10 percent by weight of reforming catalyst (Catalyst B) and 90 percent by weight of fluorided zeolite-containing cracking catalyst (Catalyst A) possessed increased activity and produced less carbon than the unfluorided physical mixture.

While the invention has been described by reference to specific examples, these examples were for purposes of illustration only. They should not be construed to limit the spirit or scope of the invention.

We claim:

1. An improved fluorided zeolite type cracking catalyst consisting essentially of at least 90 percent by weight of a composite of a Y-zeolite in a silica-alumina matrix and containing about 0.1 to about 5 percent by weight of fluorine, said improved cracking catalyst prepared by contacting said composite with an aqueous solution of a fluorine compound, in an amount just sufficient for incipient wetting of said composite for a period of 16 to 24 hours, drying, and calcining the resulting fluorided catalyst.

2. An improved cracking catalyst in accordance with claim 1 wherein said fluorine compound is selected from the group consisting of hydrogen fluoride, ammonium fluoride, ammonium bifluoride, boron trifluoride, ammonium fluoborate, and ammonium fluosilicate.

3. An improved cracking catalyst in accordance with claim 2 wherein said fluorine compound is hydrogen fluoride.

4. An improved cracking catalyst in accordance with claim 1 wherein said fluorided catalyst contains about 1.0 percent by weight of fluoride.

5. An improved cracking catalyst according to claim 1 comprising from about 5 to about 10 percent by weight of a metallic reforming catalyst comprising from about 0.01 to about 2 percent by weight of platinum on an alumina support.

6. An improved cracking catalyst in accordance with claim 5 wherein said metallic reforming catalyst also contains a catalytically effective amount of a metal selected from the group consisting of tin, germanium, and rhenium on said support.

7. An improved cracking catalyst in accordance with claim 5 or 6 wherein said support is gamma alumina.

8. An improved method for the preparation of a fluorided zeolite cracking catalyst containing from about 0.1 to about 5 percent fluorine by weight which comprises contacting a composite of a Y zeolite in a silica-alumina matrix with an aqueous solution of a fluorine compound in an amount just sufficient to produce incipient wetness of said composite for a period of 16 to 24 hours at 32° F., and thereafter drying and calcining the resulting fluorided composite.

* * * * *